(12) United States Patent
Gilboa et al.

(10) Patent No.: US 8,619,122 B2
(45) Date of Patent: *Dec. 31, 2013

(54) DEPTH CAMERA COMPATIBILITY

(75) Inventors: Guy Gilboa, Tivon (IL); Avishai Adler, Haifa (IL); Sagi Katz, Yokneam (IL)

(73) Assignee: Microsoft Corporation, Redmond, WA (US)

( * ) Notice: Subject to any disclaimer, the term of this patent is extended or adjusted under 35 U.S.C. 154(b) by 661 days.

This patent is subject to a terminal disclaimer.

(21) Appl. No.: 12/698,944

(22) Filed: Feb. 2, 2010

(65) Prior Publication Data

US 2011/0187820 A1    Aug. 4, 2011

(51) Int. Cl.
    H04N 13/00    (2006.01)
    H04N 13/02    (2006.01)
    G06K 9/40     (2006.01)

(52) U.S. Cl.
     USPC .............................................. 348/43; 348/46

(58) Field of Classification Search
     None
     See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Jay Patel
*Assistant Examiner* — Reza Aghevli
(74) *Attorney, Agent, or Firm* — Alleman Hall McCoy Russell & Tuttle LLP

(57) ABSTRACT

Compatibility between a depth image consumer and a depth image producer is provided by receiving a native depth image having an unsupported type that is not supported by a depth image consumer, and processing the native depth image into an emulation depth image having a supported type that is supported by the depth image consumer. This emulation depth image is then output to the depth image consumer.

20 Claims, 10 Drawing Sheets

(56) References Cited

U.S. PATENT DOCUMENTS

| | | |
|---|---|---|
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,952 B1 | 2/2006 | Matsumoto et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,508,545 B2 | 3/2009 | Ng et al. |
| 7,536,032 B2 | 5/2009 | Bell |
| 7,551,771 B2 * | 6/2009 | England, III ................... 382/154 |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,587,099 B2 | 9/2009 | Szeliski et al. |
| 7,590,262 B2 * | 9/2009 | Fujimura et al. ............... 382/104 |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,835,569 B2 * | 11/2010 | Marcu ........................... 382/162 |
| 7,852,262 B2 | 12/2010 | Namineni et al. |
| RE42,256 E | 3/2011 | Edwards |

(56) References Cited

U.S. PATENT DOCUMENTS

| | | | |
|---|---|---|---|
| 7,898,522 B2 | 3/2011 | Hildreth et al. | |
| 8,009,871 B2* | 8/2011 | Rafii et al. | 382/106 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2001/0014171 A1 | 8/2001 | Iijima et al. | |
| 2003/0043277 A1 | 3/2003 | Kamon | |
| 2004/0032980 A1 | 2/2004 | Harman | |
| 2004/0109585 A1* | 6/2004 | Tao et al. | 382/106 |
| 2005/0237323 A1 | 10/2005 | Shimamura et al. | |
| 2007/0035831 A1 | 2/2007 | Gutierrez Novelo | |
| 2007/0109409 A1* | 5/2007 | Yea et al. | 348/153 |
| 2008/0026838 A1 | 1/2008 | Dunstan et al. | |
| 2008/0112610 A1* | 5/2008 | Israelsen et al. | 382/154 |
| 2008/0246759 A1* | 10/2008 | Summers | 345/420 |
| 2008/0317357 A1 | 12/2008 | Steinberg et al. | |
| 2009/0002483 A1* | 1/2009 | Yanagawa et al. | 348/46 |
| 2009/0116732 A1* | 5/2009 | Zhou et al. | 382/154 |
| 2009/0129667 A1* | 5/2009 | Ho et al. | 382/154 |
| 2009/0136091 A1 | 5/2009 | Woodfill et al. | |
| 2009/0158220 A1* | 6/2009 | Zalewski et al. | 715/863 |
| 2009/0160934 A1* | 6/2009 | Hendrickson et al. | 348/47 |
| 2009/0169057 A1* | 7/2009 | Wu et al. | 382/106 |
| 2009/0232389 A1* | 9/2009 | Lee et al. | 382/154 |
| 2009/0284645 A1* | 11/2009 | Nozaki et al. | 348/349 |

FOREIGN PATENT DOCUMENTS

| | | | | |
|---|---|---|---|---|
| EP | 1353518 A1 | 10/2003 | | |
| JP | 08044490 A1 | 2/1996 | | |
| WO | 93/10708 A1 | 6/1993 | | |
| WO | 97/17598 A1 | 5/1997 | | |
| WO | 99/44698 A1 | 9/1999 | | |
| WO | WO 2007/148219 | * | 12/2007 | H04N 13/00 |
| WO | WO 2008/020734 | * | 2/2008 | H04N 7/24 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Frank, et al., "Denoising of Continuous-Wave Time-of-Flight Depth Images using Confidence Measures", Retrieved at <<http://www.inf.ethz.ch/personal/mafrank/paper/frank_filteranalysis_OE09.pdf>>, 2008, pp. 24.

Lee, et al., "Real-Time Depth-of-Field Rendering Using Anisotropically Filtered Mipmap Interpolation", Retrieved at <<http://www.mpi-inf.mpg.de/~slee/pub/papers/lee09-tvcg-dof-preprint.pdf>>, IEEE Transactions on Visualization and Computer Graphics, vol. XX, No. X, Sep./Oct. 2008, pp. 1-12.

Jiang, et al., "Noise Reduction Using Multi-resolution Edge Analysis ", Retrieved at <<http://dragon.larc.nasa.gov/retinex/background/pubabs/papers/noisered.pdf>>, Nov. 17, 2009, pp. 11.

Perona et al. "Scale-Space and Edge Detection Using Anisotropic Diffusion", IEEE Transactions on Pattern Analysis and Machine Intelligence, v.12 n.7, 1990, p. 629-639.

Weickert et al., "Efficient and reliable schemes for nonlinear diffusion filtering", IEEE Trans. Image Proc., v.7 n.3, 1998, pp. 398-410.

"International Search Report", Mailed Date: Sep. 20, 2011, Application No. PCT/US2011/020720, Filed Date: Jan. 11, 2011, pp. 8.

European Patent Office, European Saerch Report of EP11740160.4, Germany, Jun. 5, 2013, 3 pages.

European Patent Office, European Exam Report of EP11740160.4, Germany, May 15, 2013, 5 pages.

* cited by examiner

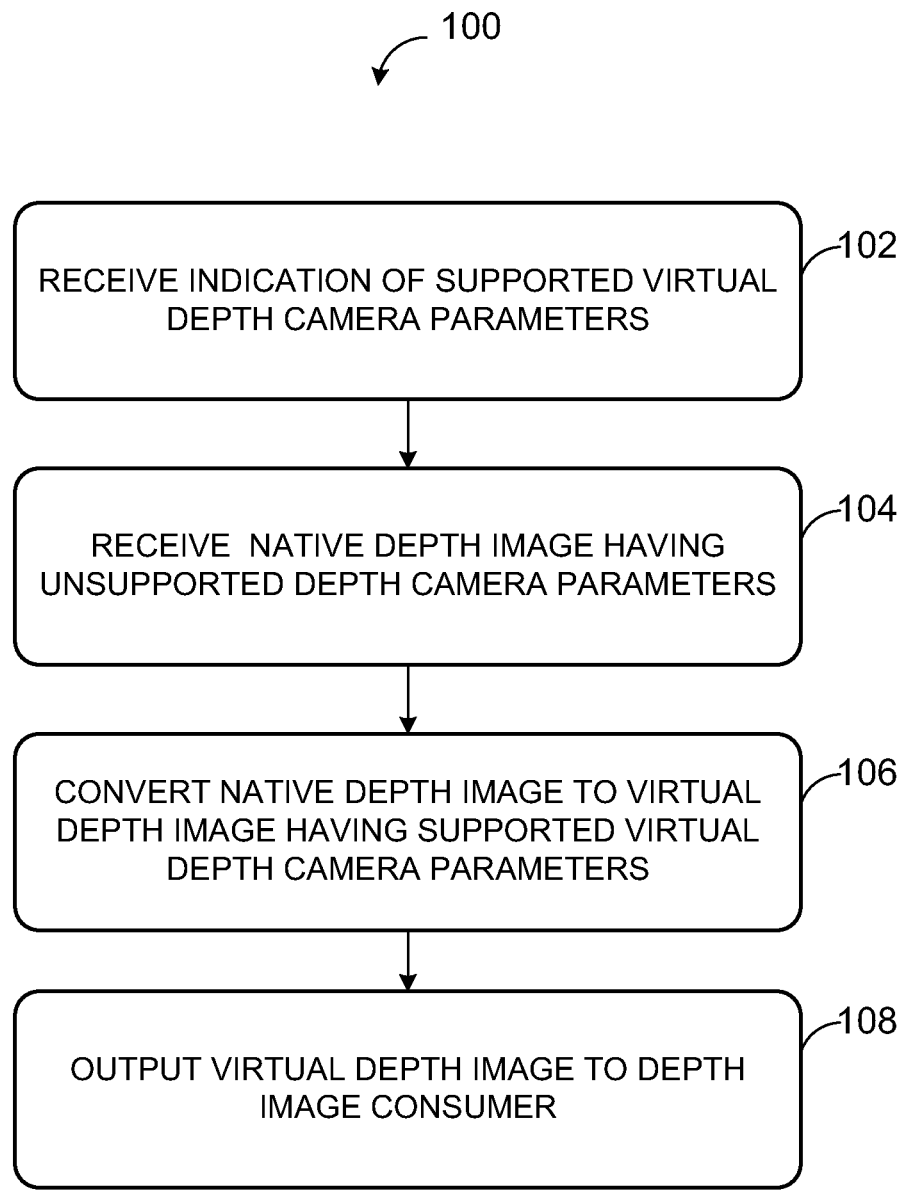

DEPTH CAMERA COMPATIBILITY

BACKGROUND

Cameras can be used to capture still images of a scene. Several still images taken in rapid succession can be used to generate a movie including a plurality of frames, each frame corresponding to a different still image. While such images are very useful in a variety of different applications, such images are not well suited for some purposes. In particular, conventional still images and movies do not provide adequate information to accurately assess the relative depths of the various surfaces captured in the scene. Different types of depth cameras have been developed to fill this need. However, the various different types of depth cameras may produce depth images that differ from one another in one or more respects. As such, applications that consume depth images may only be compatible with a particular type of depth camera that produces depth images with expected characteristics.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, compatibility between a depth image consumer and a depth image producer may be provided by receiving a native depth image having an unsupported type that is not supported by a depth image consumer, and processing the native depth image into an emulation depth image having a supported type that is supported by the depth image consumer. This emulation depth image may then be output to the depth image consumer.

BRIEF DESCRIPTION OF THE DRAWINGS

FIG. 5 shows an example method of providing compatibility between a depth image consumer and a plurality of different depth image producers.

DETAILED DESCRIPTION

The present disclosure is directed to depth camera compatibility. Compatibility technology, as described herein, allows different models of depth cameras to be used by the same computing system. An application developer may easily create applications that are compatible with a variety of different depth cameras, including depth cameras that do not exist at the time the application developer creates an application. According to one aspect of the disclosure, an application developer may create an application that is configured to work with a generic virtual depth camera, and the compatibility technology can transform native input from a variety of different depth cameras into a form that is compatible with the generic virtual depth camera. In this way, an application can be compatible with a variety of different depth cameras, including depth cameras that utilize completely different depth-finding technologies (e.g., structured light, time of flight, stereo vision, etc.).

Using the technology described herein, an application developer need not be concerned with the tedious and difficult job of supporting a variety of different depth cameras, but instead may develop for a single generic virtual depth camera. At the same time, the compatibility technology facilitates the development and implementation of new depth cameras that may offer improved performance, lower manufacturing and/or operating costs, improved energy efficiency, and/or other useful characteristics. As such, as new camera technologies are developed, such technologies may be implemented in new cameras that are backward compatible with previously developed applications.

Figure 1:
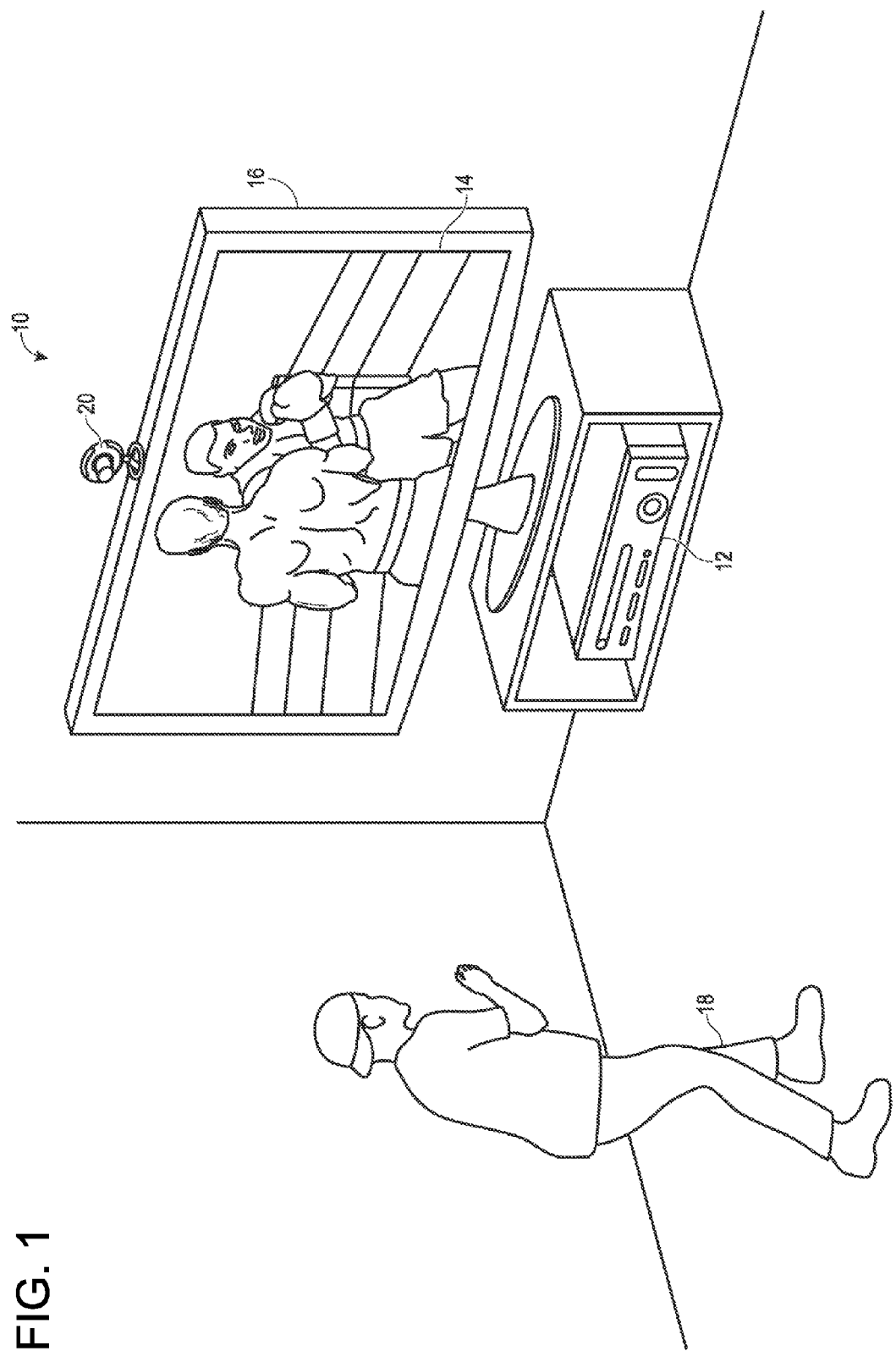
FIG. 1 shows an example depth camera usage environment.

FIG. 1 shows a nonlimiting example of a computing system 10 that may be designed with a depth camera interchangeability system that provides camera compatibility as introduced above. In particular, FIG. 1 shows a gaming console 12 that may be used to play a variety of different games, play one or more different media types, and/or control or manipulate non-game applications. FIG. 1 also shows a display 14 in the form of a high-definition television, or HDTV 16, which may be used to present visual information to users, such as user 18. Furthermore, FIG. 1 shows a capture device in the form of a depth camera 20, which may be used to visually monitor one or more users, such as user 18. While described in the context of a gaming system, it is to be understood that depth camera interchangeability systems may be implemented in virtually any computing system configured to use depth images from depth cameras.

A computing system, such as gaming console 12, may be used to recognize, analyze, and/or track one or more targets, such as user 18. Target movements may be interpreted as operating system and/or application controls. Virtually any controllable aspect of an operating system and/or application may be controlled by movements of a target, such as user 18.

Additionally or alternatively, depth information acquired via depth camera 20 may be used for purposes other than tracking a target. As an example, depth camera 20 may be used to visually survey a room and/or one or more objects. Depth information acquired from the depth camera 20 may be used to create a three-dimensional computer-readable model of the room and/or object(s) being surveyed.

As another example, a depth camera may be used as a proximity sensor on a moving computing system, such as a vehicle or a robot.

A depth camera, such as depth camera 20, may be used to provide these and a variety of other useful functions. In particular, applications can be developed and deployed for providing any number of different functions that take advantage of depth information from a depth camera. However, most applications include complicated algorithms and processing strategies for deducing real world characteristics of a viewed scene from the depth information. For example, skeletal tracking algorithms and processing strategies may be employed to model a target, such as user 18, with a machine representation of a skeleton that tracks the target. As another example, floor finding algorithms may be employed to find a floor within a scene.

Applications that do not utilize the herein described camera compatibility technology may be designed to receive depth information in a particular format and/or with particular parameters. Such an application may not be able to use depth information that does not match the desired format and/or parameters. In some cases, depth information that does not match the desired format and/or parameters may crash such an application.

Each different type of depth camera may produce depth information having one or more formatting differences and/or different parameters. As such, up until now applications have been designed with a particular depth camera in mind. However, when an application is designed to be used with only a particular depth camera, that application may not be able to support new cameras, which may output depth information in an unfamiliar format and/or with unexpected parameters.

Figure 2:
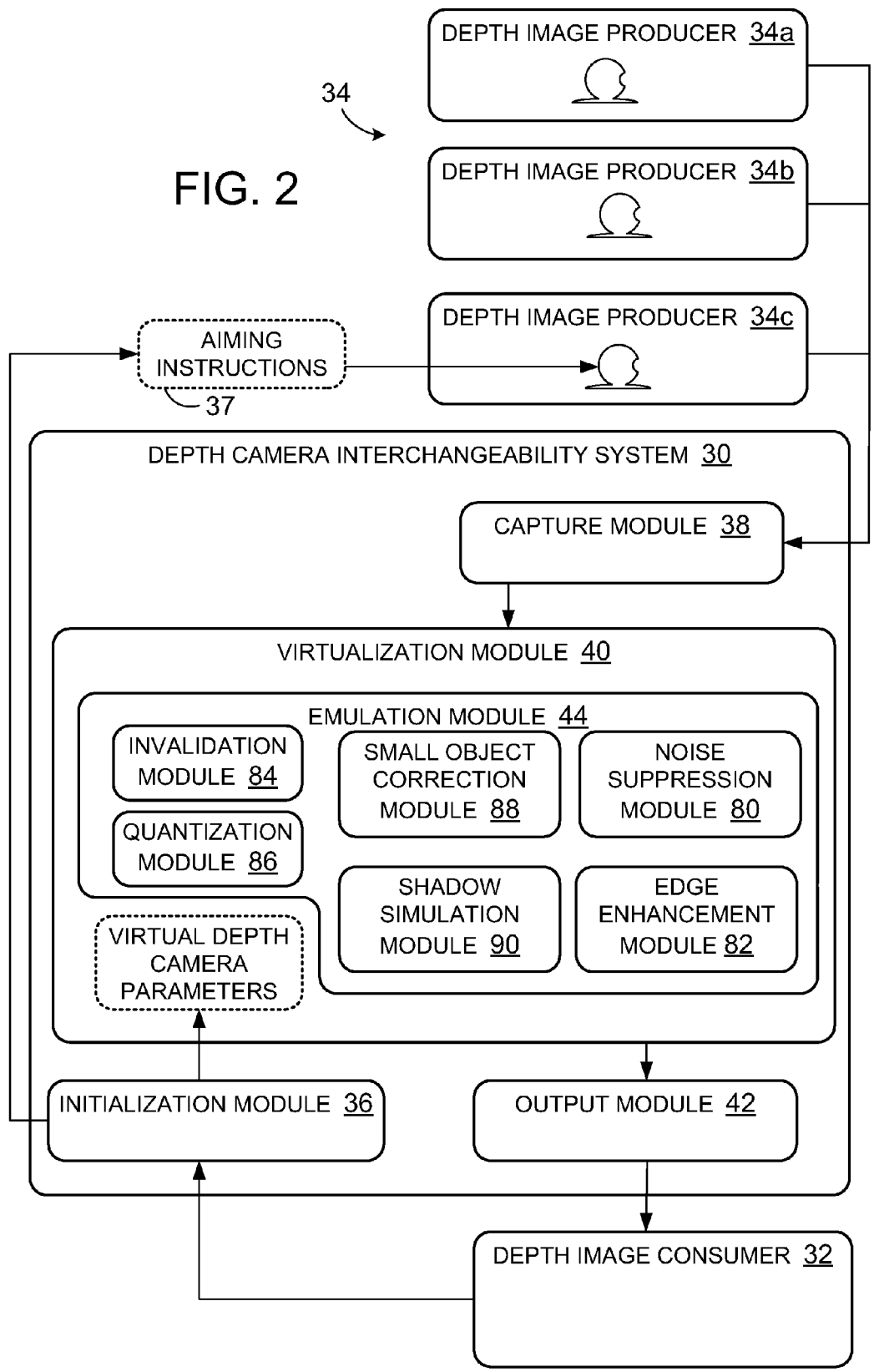
FIG. 2 shows a depth camera interchangeability system in accordance with an embodiment of the present disclosure.

FIG. 2 schematically shows a depth camera interchangeability system 30 that provides compatibility between a depth image consumer 32 and a plurality of different depth image producers 34 (e.g., depth image producer 34a, depth image producer 34b, and depth image producer 34c). As used herein, a depth image consumer refers to any operating system, application, service, process, module, engine, or other object that is configured to utilize depth information from a depth camera.

Depth camera interchangeability system 30 provides a great deal of flexibility with respect to which models of depth cameras can be used with depth image consumers. Cameras having different parameters, cameras based on different depth finding technologies, and cameras producing different types of depth images may be interchangeably used with depth camera interchangeability system 30.

As an example, depth image producer 34a may include a depth camera that uses structured light technology to assess depth images; and depth image producer 34b may include a depth camera that uses time of flight technology to assess depth images. Both such cameras are compatible with depth image consumer 32 because of depth camera interchangeability system 30. Depth image consumer 32 need not have been specifically designed for compatibility with either camera. Depth image consumer 32 may be developed before either camera is released. In other words, depth camera interchangeability system 30 facilitates compatibility with depth image consumers and a variety of different depth cameras, including depth cameras developed after the depth image consumer is developed.

As shown in FIG. 2, depth camera interchangeability system 30 includes an initialization module 36, a capture module 38, a virtualization module 40, and an output module 42. In at least some embodiments, the initialization module, the capture module, the virtualization module, the output module, and/or other components of depth camera interchangeability system 30 may be implemented as part of an application programming interface (API). An API may be implemented by operating systems, applications, libraries, and/or other objects to establish the communication conventions to be used between a depth image producer and a depth image consumer. An API may include specifications for routines, data structures, object classes and protocols used to communicate between the depth image producer and the depth image consumer. Furthermore, the API may include, or interface with, functional blocks configured to process various aspects of a depth image, as described below with reference to virtualization module 40 and emulation module 44, for example.

Initialization module 36 may be configured to acknowledge supported virtual depth camera parameters for a depth image consumer, such as depth image consumer 32. To enable such an acknowledgement, a depth image consumer, such as a skeletal tracking game application, may be developed for compatibility with a virtual depth camera in addition to, or instead of, a particular depth camera (e.g., a structured light depth camera of a particular make and model). In such instances, the depth image consumer may be configured to provide an indication of the virtual depth camera parameters expected by that depth image consumer (e.g., x-y-z resolution, view frustum, depth image type, etc.). Furthermore, the initialization module may be configured to receive an indication of the supported virtual depth camera parameters from the depth image consumer. As discussed above, the initialization module may optionally be implemented as part of an API that the depth image consumer and depth image producer can use to communicate with one another.

The indication of the supported virtual depth camera parameters may specify an expected view frustum of a virtual depth camera and/or an expected resolution of a virtual depth camera. Such an expected view frustum and/or expected resolution may be different than the native view frustum and native resolution of a particular depth camera. The indication of the supported virtual depth camera parameters may specify a model of an actual depth camera on which a virtual depth camera is based. The following description summarizes a nonlimiting sampling of different parameters that may be acknowledged by the initialization module 36.

Figure 3A:
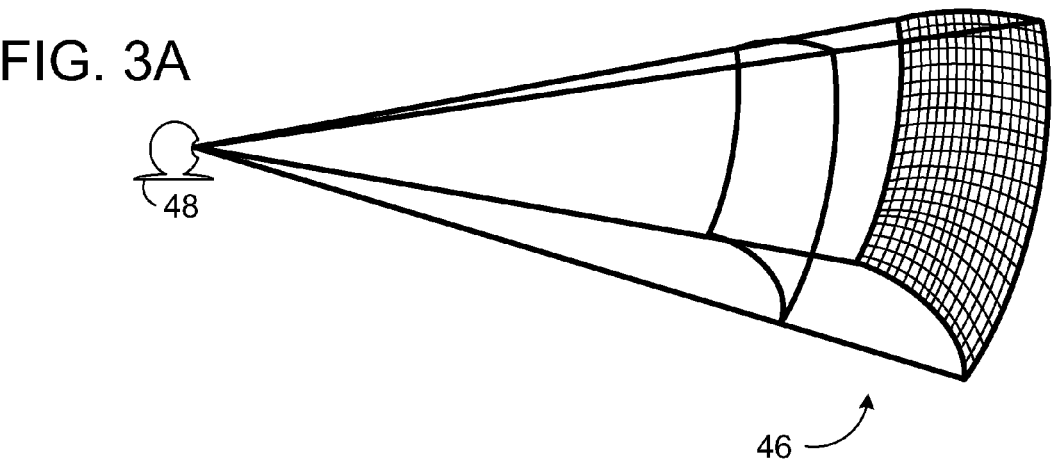
FIGS. 3A and 3B schematically show depth camera view frustums.

Depth cameras generally measure at each pixel the radial distance from a nearest surface to the depth camera sensor. This distance may be converted into world coordinates by projecting the distance along rays from the depth camera into a three dimensional space modeling the real world. This process produces a range of three-dimensional samples for which tight linear boundaries may not exist. Instead, the points are bounded by the view frustum of the depth camera—the space caught between two three-dimensional arcs of two concentric balls (assuming no lens distortions). FIG. 3A shows an example view frustum 46 for an example depth camera 48.

The position of the concentric balls is determined by the depth of field measurable by the depth camera. The smaller of the concentric balls has a radius that is equivalent to the minimum measurable distance for that depth camera, and the larger of the concentric balls has a radius that is equivalent to the maximum measurable distance for that depth camera. The size of the three-dimensional arcs in space is determined by the field of view (i.e., view angles) for that depth camera. The position and direction of the view frustum of the depth camera is determined by the physical position and physical orientation of the depth camera. How many different pixels are included in the view frustum is determined by the resolution of the depth camera. The sensitivity (resolution) of the depth depends on the number of bits per pixel that are received as output from the depth camera. However, the actual sensitivity may be lower.

The parameters (e.g., depth of field, field of view, resolution, position, direction, lens distortion, etc.) may be different for different cameras. The difference in parameters between cameras can pose difficulties because depth image consumers may be highly sensitive to such differences. As such, instead of being developed to receive depth images from a particular depth camera having certain depth camera parameters, a depth image consumer may be developed for compatibility with a virtual depth camera having virtual depth camera parameters. As described below, the depth camera interchangeability system may effectively translate depth information received from an actual camera in accordance with the virtual parameters of the virtual depth camera so that the depth information from the actual camera may be used by the depth image consumer.

In some embodiments, the initialization module 36 may be configured to generate aiming instructions 37 to facilitate aiming a depth camera for compatibility with the supported virtual depth camera parameters of the depth image consumer. As an example, a depth image consumer may expect a depth camera to be aimed down toward a floor so that the feet of a user can be scanned. As such, aiming instructions can be generated to communicate this expectation. In embodiments in which the depth camera includes positioning motors or other means for automatically repositioning itself (e.g., the depth camera of depth image producer 34c), the initialization module may be configured to send the aiming instructions to the depth camera so that the depth camera may reposition itself in accordance with the aiming instructions. In some embodiments, the aiming instructions may be conveyed to a user via visual and/or audio instructions so that a user may manually reposition the depth camera.

In some embodiments, a coordinate system may be abstracted so that a depth image consumer will receive depth images having an expected coordinate system. In some instances, this may involve rotating the coordinate system to be aligned with the floor (for example), by using hardware that measures the line of sight, or by measuring the angle of the floor relative to the camera.

Capture module 38 may be configured to receive a native depth image from a depth image producer. As a nonlimiting example, the capture module may receive a native depth image from a depth image producer including a time of flight camera. As discussed above, the capture module may optionally be implemented as part of an API that the depth image consumer and depth image producer can use to communicate with one another.

Figure 4A:
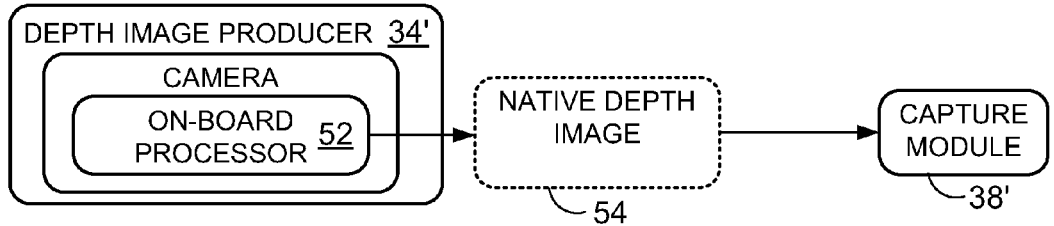
FIGS. 4A-4C show example depth image producers in accordance with the present disclosure.
Figure 4B:
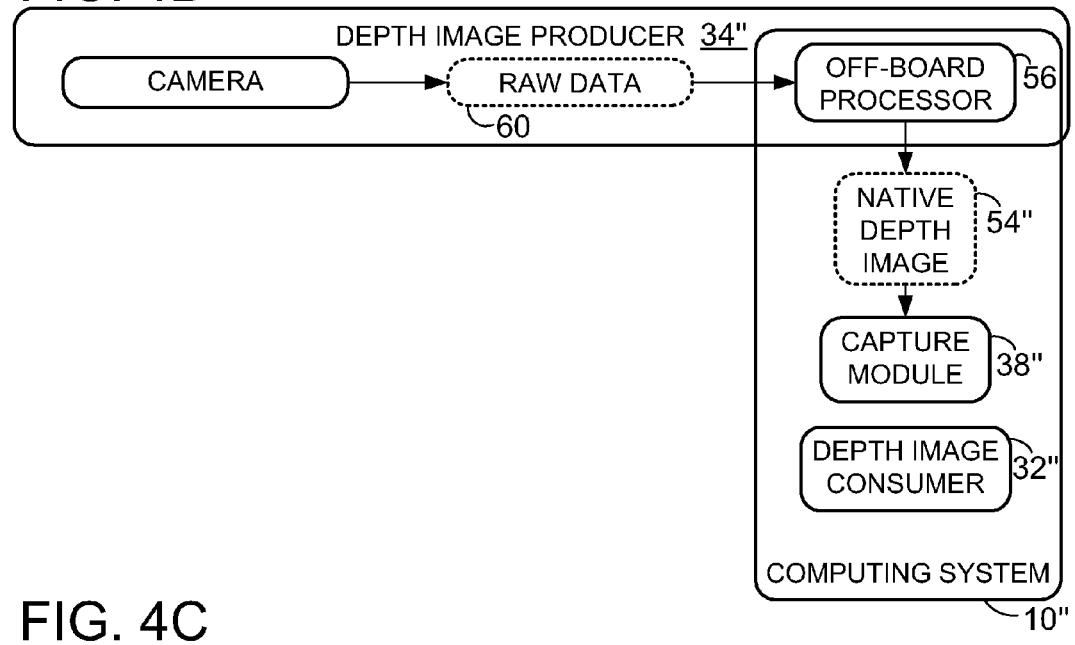
Figure 4C:
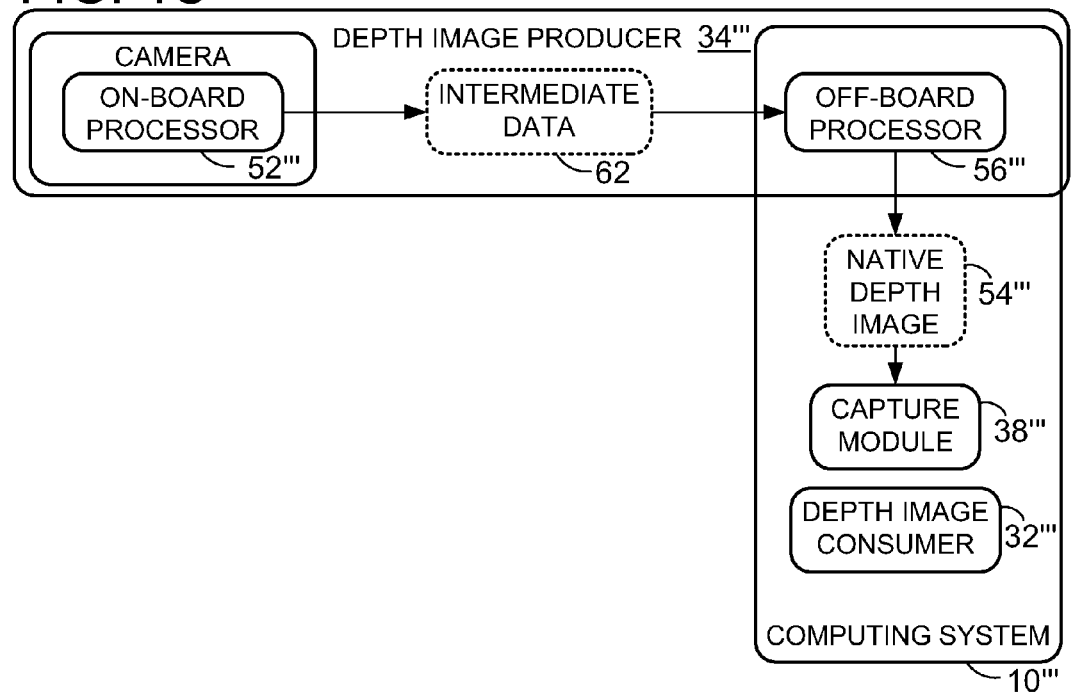

A depth image producer may include only a depth camera, or a depth image producer may include a depth camera as well as off-board processing engines. As shown in FIG. 4A, a depth image producer 34' may include an on-camera processor 52 configured to translate raw depth camera data (not shown) into a native depth image 54. In such cases, the capture module 38' may be configured to receive the native depth image 54 via the on-camera processor 52. As shown in FIG. 4B, a depth image producer 34" may include an off-camera processor 56 that translates raw depth camera data 60 into a native depth image 54". The off-camera processor 56 may be part of a computing system 10" on which a depth image consumer 32" is running, for example. In such cases, the capture module 38" may be configured to receive the native depth image via the off-camera processor 56. As shown in FIG. 4C, a depth image producer 34''' may include an on-camera processor 52''' and an off-camera processor 56''' that cooperate to translate raw depth camera data (not shown) into a native depth image 54'''. In such cases, the capture module 38''' may be configured to receive the native depth image 54''' via the on-camera processor 52''' and the off-camera processor 56'''. In particular, the on-camera processor 52''' may pass the off-camera processor 56''' intermediate data 62 that has been partially processed from the raw depth camera data. As in the example of FIG. 4B, the off-camera processor 56''' may be part of a computing system 10''' on which a depth image consumer 32''' is running, for example.

Returning to FIG. 2, virtualization module 40 may be configured to convert the native depth image to a virtual depth image having supported virtual depth camera parameters compatible with the depth image consumer. In particular, the virtualization module may be configured to convert the native depth image to a virtual depth image in accordance with the indication of the virtual parameters received via the initialization module from the depth image consumer. The virtualization module may optionally be implemented as part of an API, or as an application or service that is compatible with the API that the depth image consumer and depth image producer use to communicate.

Figure 3B:
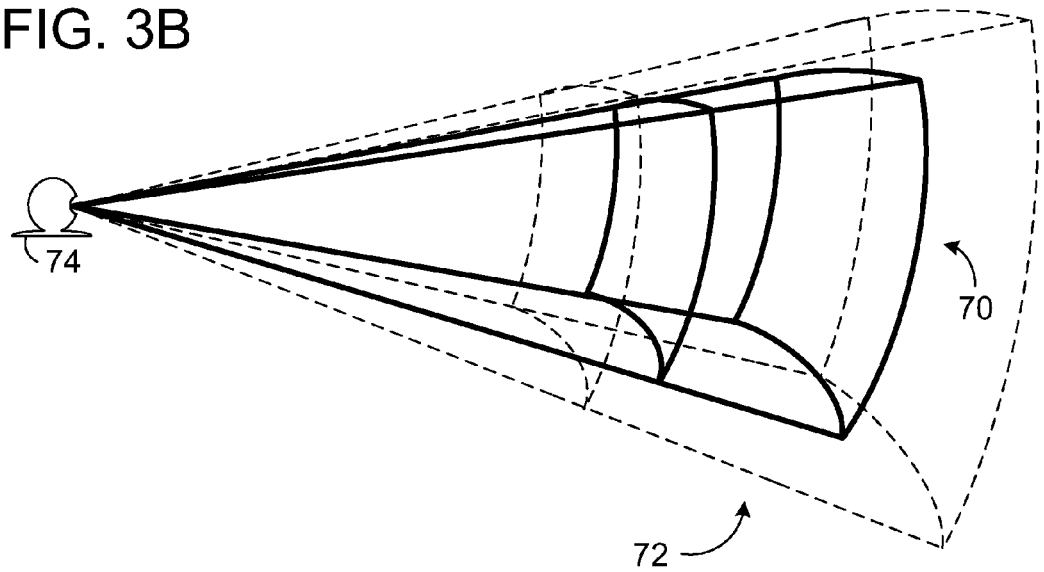

As one example conversion, the virtualization module 40 may be configured to convert the native depth image to the virtual depth image by clipping a view frustum of the native depth image. An example of this is somewhat schematically shown in FIG. 3B. A virtual view frustum 70 is illustrated in solid lines. Virtual view frustum 70 can be specified by virtual depth camera parameters. Superimposed in the same view is a native view frustum 72 of an actual depth camera 74. The native view frustum 72 is illustrated with dashed lines. As can be seen by comparison, the native view frustum 72 has a wider field of view and a deeper depth of field than virtual view frustum 70. As such, the native view frustum 72 may not be compatible for a depth image consumer expecting virtual view frustum 70.

The virtualization module may clip the native view frustum to that of the virtual view frustum. In other words, depth information read by the depth camera 74 that is outside the field of view and/or depth of field of the virtual view frustum may be removed from the depth image. In some embodiments, the removed depth information may simply be ignored while depth information in the virtual view frustum is left unchanged. In some embodiments, the removed depth information may be used to selectively modify depth information in the virtual view frustum.

As another example conversion, the virtualization module 40 may be configured to convert the native depth image to the virtual depth image by changing a resolution of the native depth image (e.g., decreasing a resolution of the native depth image). Virtually any resampling algorithm may be used to change the resolution. As a nonlimiting example, a nearest-neighbor algorithm may be used in which a sample grid having a desired resolution is conceptually aligned with the depth image from the actual depth camera. Each sample pixel of the sample grid may be assigned the depth value of the pixel from the actual depth camera that is nearest to the sample pixel. As other nonlimiting examples, resampling algorithms may take an average, or distance weighted average, of nearest pixels.

The above provided examples of clipping a view frustum and changing a resolution are nonlimiting. It is to be understood that a depth image consumer may be designed to expect a virtual camera with any number of different virtual parameters, and an actual depth image may be converted in accordance with such parameters in order to achieve compatibility with the virtual depth camera of the depth image consumer.

Returning to FIG. 2, in some embodiments, virtualization module 40 may include an emulation module 44 configured to convert the native depth image to the virtual depth image by processing the native depth image into an emulation depth image having a supported type that is supported by the depth image consumer. In other words, a depth image consumer may be designed to expect depth images that are created using a specific model of depth camera and/or a specific depth acquisition technology (e.g., structured light or time of flight). While depth images from different types of depth cameras may ultimately produce depth images in which each pixel is assigned a depth value, differences between the different types of depth cameras may result in various differences between the depth values that are assigned to each pixel. A depth image consumer may be designed to process a particular type of depth image from a particular depth camera. As such, emulation module 44 may be configured to change a depth image from an unsupported depth camera to seem as if it originated from a supported depth camera.

For instance, the emulation module 44 may convert a native depth image from a time of flight depth camera to an emulation depth image emulating a depth image produced by a structured light depth camera. This example is not limiting. The emulation module 44 may be configured to convert a native depth image from virtually any camera technology to an emulation depth image emulating a depth image produced by virtually any other type of camera technology.

While emulation module 44 may be part of a virtualization module 40 in some embodiments, it is to be understood that the emulation techniques described herein may be performed independently of any other virtualization techniques, such as view frustum clipping and/or resolution changing. In either case, the emulation module 44 may optionally be implemented as part of an API, or as an application or service that is compatible with the API that the depth image consumer and depth image producer use to communicate.

When included, an emulation module may include one or more of the following: a noise suppression module 80, an edge enhancement module 82, an invalidation module 84, a depth quantization module 86, a small object correction module 88, and a shadow simulation module 90.

Noise suppression module 80 may be configured to preserve depth edges between adjacent pixel regions with different depth values in the native depth image. The functionality of noise suppression module 80 is described in more detail below with reference to 118 of FIG. 6.

Edge enhancement module 82 may be configured to enhance depth edges between adjacent pixel regions with different depth values in the native depth image. The functionality of edge enhancement module 82 is described in more detail below with reference to 126 of FIG. 6.

Invalidation module 84 may be configured to invalidate pixels having a combined illumination and obliqueness outside a predetermined range. The functionality of invalidation module 84 is described in more detail below with reference to 120-124 of FIG. 6.

Depth quantization module 86 may be configured to quantize depth values. The functionality of depth quantization module 86 is described in more detail below with reference to 128 of FIG. 6.

Small object correction module 88 may be configured to assign deeper depth values to pixels belonging to objects below a threshold size. The functionality of small object correction module 88 is described in more detail below with reference to 130 of FIG. 6.

Shadow simulation module 90 may be configured to assign shadow pixel values to pixels that are virtually occluded from a virtual vantage point of a virtual illuminator virtually spaced away from a time of flight depth camera. The functionality of shadow simulation module 90 is described in more detail below with reference to 132 of FIG. 6.

The virtualization module 40 converts the native depth image from an actual depth camera to a virtual depth image having supported virtual depth camera parameters compatible with the depth image consumer. An output module 42 is configured to output this virtual depth image to the depth image consumer. The depth image consumer may then receive the virtual depth image for analysis and/or further processing. The output module may optionally be implemented as part of an API that the depth image consumer and depth image producer can use to communicate with one another. While the initialization module 36, the capture module 38, the virtualization module 40, and the output module 42 are described above as being discrete modules, it is to be understood that two or more of the modules may be operatively combined into a common API.

FIG. 5 shows a method 100 of providing compatibility between a depth image consumer and a plurality of different depth image producers. Method 100 may be implemented, for example, using depth camera interchangeability system 30 of FIG. 2.

At 102, method 100 includes receiving an indication of the supported virtual depth camera parameters. As described above, virtual depth camera parameters may specify a view frustum of a virtual depth camera, a resolution of a virtual depth camera, a model of an actual depth camera on which a virtual depth camera is based, and/or other characteristics of the virtual depth camera.

At 104, method 100 includes receiving a native depth image having unsupported depth camera parameters that are not compatible with a depth image consumer. At 106, method 100 includes converting the native depth image to a virtual depth image having supported virtual depth camera parameters that are compatible with the depth image consumer. As described above, converting the native depth image may include one or more of clipping a view frustum of the native depth image, decreasing a resolution of the native depth image, and/or processing the native depth image into an emulation depth image having a supported type that is supported by the depth image consumer.

At 108, method 100 includes outputting the virtual depth image to the depth image consumer. Because the virtual depth image is specifically tailored to the supported virtual depth camera parameters, it can be used by the depth image consumer. However, because method 100 can be applied to a variety of different native depth images from different depth cameras, the depth image consumer is not restricted to receiving depth images from a single particular type of depth camera.

Figure 6:
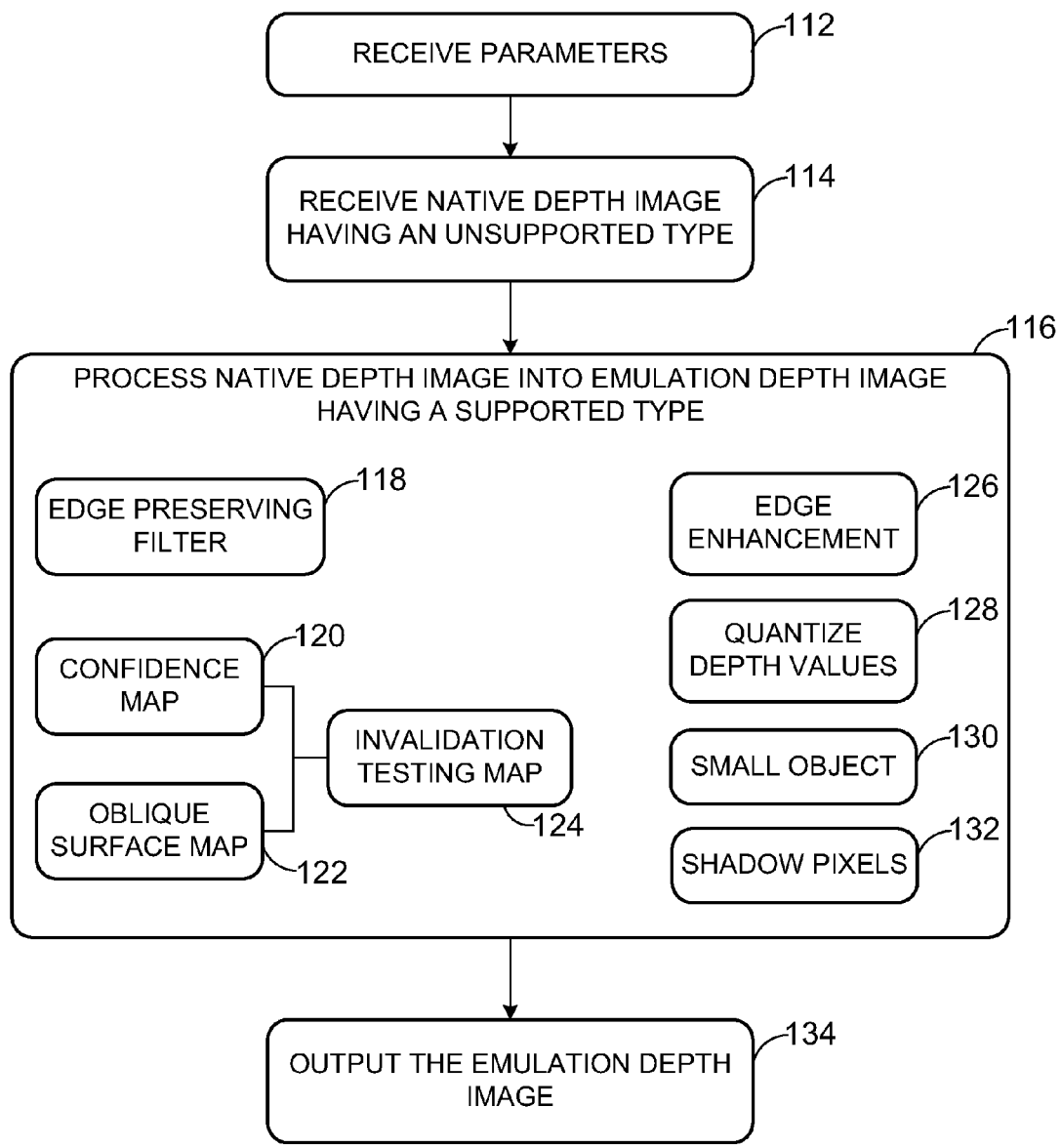
FIG. 6 shows another example method of providing depth camera compatibility.

FIG. 6 shows another method 110 of providing depth camera compatibility. At 112, method 110 includes receiving from a depth image consumer supported virtual depth camera parameters for the depth image consumer. This may include, for example, receiving an indication of a model depth camera (e.g., a structured light depth camera) that is compatible with the depth image consumer.

At 114, method 110 includes receiving a native depth image having an unsupported type that is not supported by the depth image consumer. For example, the native depth image may be from a source other than the model depth camera. As such, the native depth image may be incompatible with the depth image consumer and thus have an unsupported type. Continuing with the example introduced above, the depth image consumer may support depth images from a structured light depth camera. However, the native depth image may be received from another source such as a time of flight depth camera, and thus the native depth image has an unsupported type for the depth image consumer.

At 116, method 110 includes processing the native depth image into an emulation depth image having a supported type that is supported by the depth image consumer. In other words, the emulation depth image can be modified to emulate a depth image that is compatible with the depth image consumer, such as a depth image produced by the model depth camera. Continuing with the example introduced above, a native depth image received from a time of flight depth camera, for example, may be processed into an emulation depth image which emulates a depth image produced by a structured light depth camera.

As shown in FIG. 6, processing the native depth image into an emulation depth image may utilize a variety of techniques, as described in more detail below. It can be appreciated that such techniques are nonlimiting. Further, additional techniques not shown in FIG. 6 may alternatively or additionally be applied.

At 118, method 110 may include applying an edge preserving filter to the native depth image. For the case of processing a native depth image received from a time of flight depth camera, such a native depth image may have random noise that is a standard byproduct of time of flight depth cameras. However, structured light depth cameras inherently have a smoother signal, and such a signal may even be further filtered in software. Thus, to emulate this type of smoother signal, a native depth image received from a time of flight depth camera may be processed to suppress noise from the time of flight depth map without compromising significant depth features. To do so, an edge preserving filter may be used to suppress the noise from the native depth image. Any suitable approach may be used, such as by utilizing a nonlinear partial differential equation based off of those described in the works of Perona-Malik (Scale-Space and Edge Detection Using Anisotropic Diffusion, IEEE Transactions on Pattern Analysis and Machine Intelligence, v. 12 n. 7, p. 629-639, 1990) and Weickert et al. (J. Weickert, B. M. ter Haar Romeny, M. A. Viergever, Efficient and reliable schemes for nonlinear diffusion filtering, IEEE Trans. Image Proc., v. 7 n. 3, pp. 398-410, 1998). The edge threshold parameter may be set to the upper bound of the depth accuracy of the camera (e.g., K=10 [cm]). By applying the edge preserving filter to the native depth image, the level of noise in the native depth image can drop significantly while discontinuities between objects in the native depth image are well preserved.

Continuing with FIG. 6, at 120, method 110 may include building a confidence map by passing a median filter on an illumination image (e.g., as measured from the IR light used to illuminate the scene in time of flight analysis). For the case of processing a native depth image received from a time of flight depth camera to emulate that of a structured light depth camera, such a confidence map may be utilized to emulate a pixel invalidation phenomenon that occurs in structured light depth cameras. In the structured light technology, depth is computed by finding pattern matches; if a match is found then the depth can be computed relatively accurately, however, if a match is not found then the depth cannot be computed and the measurement at that pixel is invalid. In time of flight technology, depth can typically be measured everywhere, but at different accuracies (e.g., depending on the level of illumination). Thus, the level of illumination in a time of flight depth image can readily predict where depth measurements are inaccurate (e.g., the signal is too noisy in dark regions) and thus emulate a structured light depth image. To do so, a confidence map may be built, using an illumination image as an input. The confidence map may be built by first passing a median filter on the illumination image, to remove outliers and suppress noise. Then, for each pixel, a soft threshold function can be used, such as $$F_k(s) = \frac{1}{1 + (s/k)^2}$$

wherein the parameter k may be changed between camera versions. As an example, k may be set to 60 in some embodiments.

In addition to building the confidence map, it may be desirable to identify other regions within the image. Thus, at 122, method 110 may include building an oblique surface map from the native depth image. For the case of processing a native depth image received from a time of flight depth camera to emulate that of a structured light depth camera, the pixel invalidation phenomenon occurring in structured light depth cameras may be further emulated by identifying regions likely to correspond to pattern matching difficulties. The patterns projected by a structured light illumination device may be smeared on oblique objects (i.e., surfaces of sharp angles, with respect to the illumination rays), and thus, pattern matches often fail there and yield invalid measurements. Accordingly, a native depth image received from a time of flight depth camera may be processed by building an oblique surface map to identify oblique surfaces. This may include computing the world surface angle for each pixel, for example, using camera parameters such as the field of view and resolution, and then smoothing this by Gaussian filtering. Further, a soft thresholding function may be used, such as $F_k$ as defined above, with k=45.

At 124, method 110 may include unifying the confidence map and the oblique surface map into an invalidation testing map. For the case of the confidence map and the oblique surface map both having values between zero and one, the two maps may be unified, for example, by multiplying the two maps and thresholding with a threshold value of 0.5. A median filter can be used to regularize the result. Such a process can be used to invalidate pixels that are outside a predetermined range.

Continuing with FIG. 6, at 126, method 110 may include enhancing edges between adjacent pixel regions with different depth values in the native depth image. For the case of processing a native depth image received from a time of flight depth camera, such a time of flight depth camera tends to blur the edges, since the depth value as calculated in this technology is an average of the depth in the pixel field of view. However, a structured light depth camera's depth on edges is typically not measured and the data is synthesized, creating sharp transitions between objects. Thus, to emulate a depth image from a structured light depth camera, the native depth image from the time of flight depth camera may be processed to enhance edges between adjacent pixel regions with different depth values to make the edges sharper. Any suitable approach may be used for such edge enhancement, and one such suitable approach is described in detail as follows.

A forward difference D+ and a backward difference D- in the x direction can be computed for a pixel. Then, a mask can be determined as follows: Mask_x=1 if (min(D+, D-)>4 cm), 0 otherwise, which ramps to avoid step edges. A similar calculation can then be done in the y direction to compute Mask_y. Then, for each pixel where either Mask_x or Mask_y=1, the maximum in a 3×3 neighborhood is taken.

Continuing with FIG. 6, at 128, method 110 may include quantizing depth values. For the case of processing a native depth image received from a time of flight depth camera, depth values may be quantized to emulate a depth image received from a structured light depth camera. Structured light technology is based on triangulation to compute the depth. The depth is a function of the pattern displacement, which is quantized as the native sensor resolution is finite. In time of flight technology, the depth measurements are not related to the native resolution. Thus, it might be desired to incorporate the quantization effect into the transformed depth map. This may be done by any suitable approach. One such suitable approach includes taking the parameters of the structured light depth camera (e.g., field of view, native sensor resolution, focal length, distance between the sensor and illumination centers) and the depth map to construct a nonlinear quantization formula similar to the one occurring in triangulation-based cameras. As an example, the translation T in pixels as a function of the depth D may be defined as follows, $T(D)$=INT(focal_length*(camera_illum/$D$+TAN (angle))/ pixel_size+0.5), where focal_length is the focal length of the structured light depth camera, pixel_size is the sensor pixel size, camera_illum is the distance between the camera sensor and illumination centers, and angle is the angle of the object with respect to the line perpendicular from the camera sensor center. Then, the quantization Q, as a function of the translation T(D) may be described as follows, $Q(T)$=camera_illum/(($T$)*pixel_size/focal_length– TAN(angle)) –camera_illum/(($T$+1)*pixel_size/ focal_length–TAN(angle)).

As such, the depth map has quantized depth in a similar manner to that created by triangulation computations in the structured light technology.

Continuing with FIG. 6, at 130, method 110 may include assigning deeper depth values to pixels belonging to objects below a threshold size. For the case of processing a native depth image received from a time of flight depth camera, deeper depth values may be assigned to pixels of small objects to emulate a depth image received from a structured light depth camera. A structured light depth camera is based on patterns which cannot be projected well on objects that are too small. Thus, such small objects are often assigned the background depth values. Deeper depth values may be assigned to pixels of small objects in any suitable manner. One such approach includes performing a morphological closing. As such, the structuring element depends on the resolution. As an example, a ball element with an approximate 3×3 size may be used. Thus, the smallest object size that can be observed in the depth image can be corrected and the effects are similar to the post-processing done in structured light depth cameras.

Figure 7:
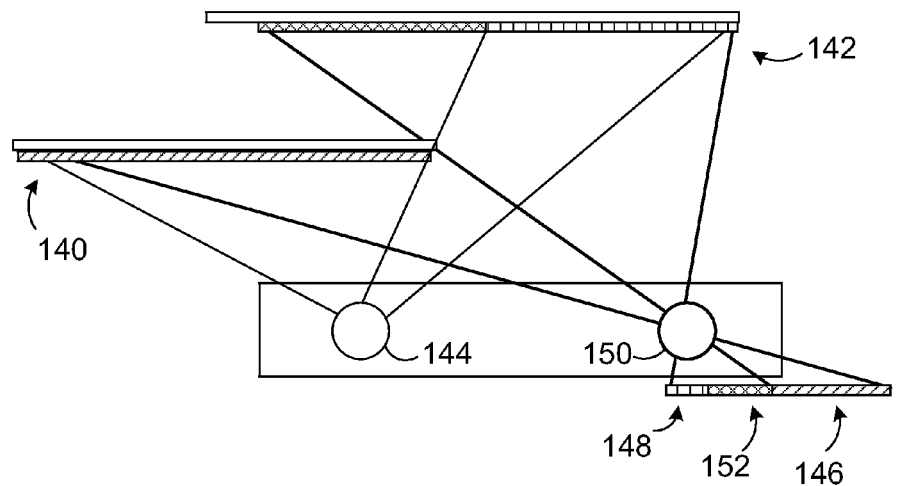
FIG. 7 schematically shows an example of a shadow effect created on a sensor which is distanced from a light source.

Continuing with FIG. 6, at 132, method 110 may include assigning shadow pixel values to pixels that are virtually occluded from a virtual vantage point of a virtual illuminator virtually spaced away from the time of flight depth camera. For the case of processing a native depth image received from a time of flight depth camera, shadow pixel values may be assigned to emulate a depth image received from a structured light depth camera. As described above, a structured light depth camera works on the principal of triangulation. Due to this fact, the light source is distanced from the sensor and a "shadow" effect is created on the sensor of the camera. Thus, "shadowed pixels" are pixels that are visible to the sensor but not directly visible from the position of the light source, as illustrated in FIG. 7. Here, a first object 140 occludes a second object 142 from receiving direct light from light emitter 144. Thus, in addition to receiving an image 146 of the first object 140 and an image 148 of the second object 142, sensor 150 also received shadowed pixels 152 of second object 142.

Thus, it may be desired to emulate this "shadowing" artifact in the native depth image received from the time of flight depth camera. It can be appreciated that a shadow effect already occurs in a time of flight depth camera, due to a small distance between the sensor and surrounding emitters; however, this may be normalized in the camera and therefore it may not be visible in the produced depth video.

An example solution for synthesizing the shadows uses a lightweight algorithm. The algorithm creates a virtual camera in the same place as where the light emitter would be in the modeled depth camera. The algorithm then transforms the depth samples from the original sensor to this virtual sensor. This transformation can be done using the following equations:

$$fl_x = \frac{imgWidthPix}{2TAN(FOV_x)}$$

$$X_{world} = \frac{Z_{world}}{fl_x}(X_{sensorImage} - principalPt_x)$$

$$X_{emitterImage} = \frac{fl_x(X_{world} + distanceToEmitter)}{Z_{world}} + \frac{1}{2}imgWidthPix$$

Figure 8:
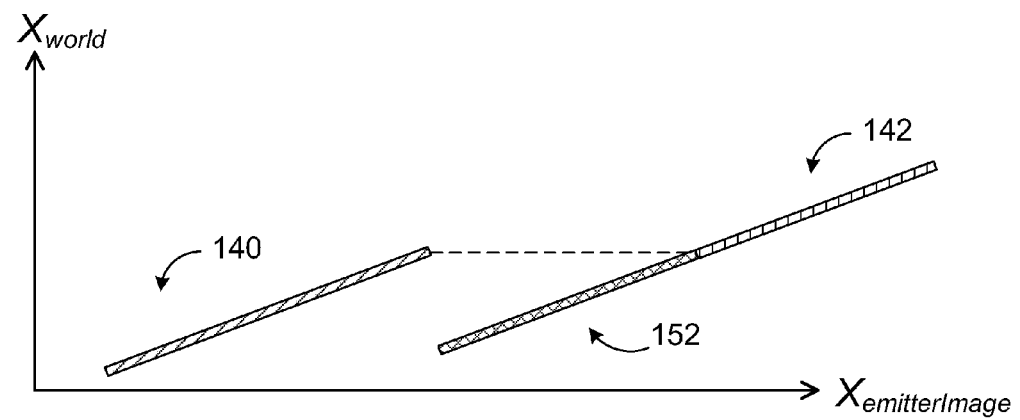
FIG. 8 schematically shows an example plot illustrating the finding of shadowed pixels via a shadow synthesis algorithm.

Samples that are occluded in this virtual sensor are shadowed. Each row of "emitter×image" can be scanned, and pixels may be shadowed if they do not have the maximum $X_{emitterImage}$ value among the already scanned values. FIG. 8 illustrates the idea where the shadowed pixels 152 are considered as shadowed due to the drop in the values of $X_{world}$.

In order to overcome some small fluctuations due to inaccuracy of the depth measurements, a morphological "open" filtering can be applied to the map of "shadowed pixels." This step removes small shadows and makes the edges appear more square-like, thus emulating edges from structured light depth cameras.

Continuing with FIG. 6, at 134, method 110 includes outputting the emulation depth image having the supported type. Such an emulation depth image may be used by a depth image consumer that cannot process native depth images from the depth camera. Using the above example, an application designed to process structured light depth images from a structured light depth camera may receive and process emulation depth images based off of native depth images measured using a time of flight depth camera.

Figure 9:
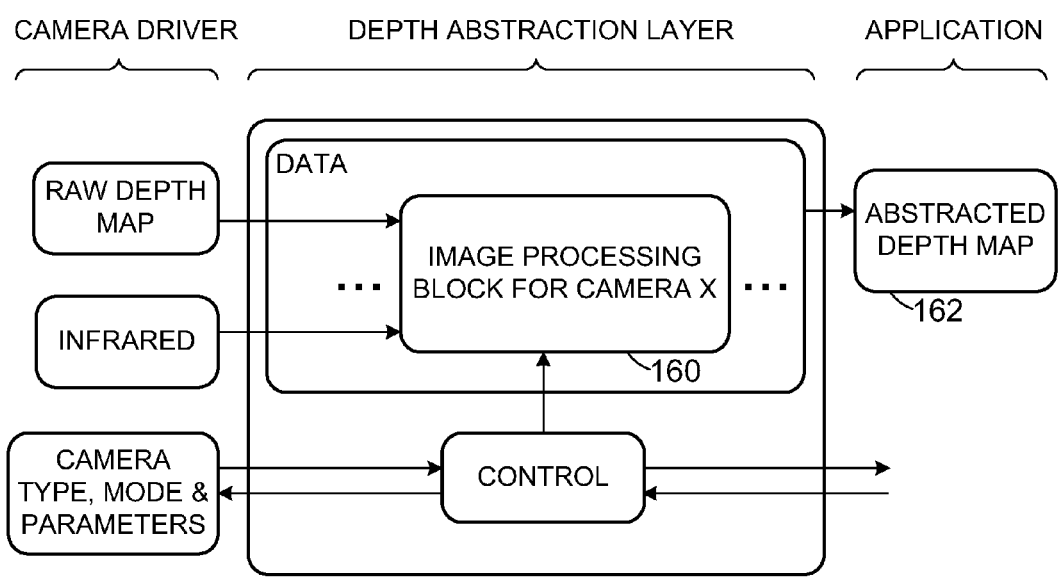
FIG. 9 schematically shows an example image processing block within a depth abstraction layer.
Figure 10:
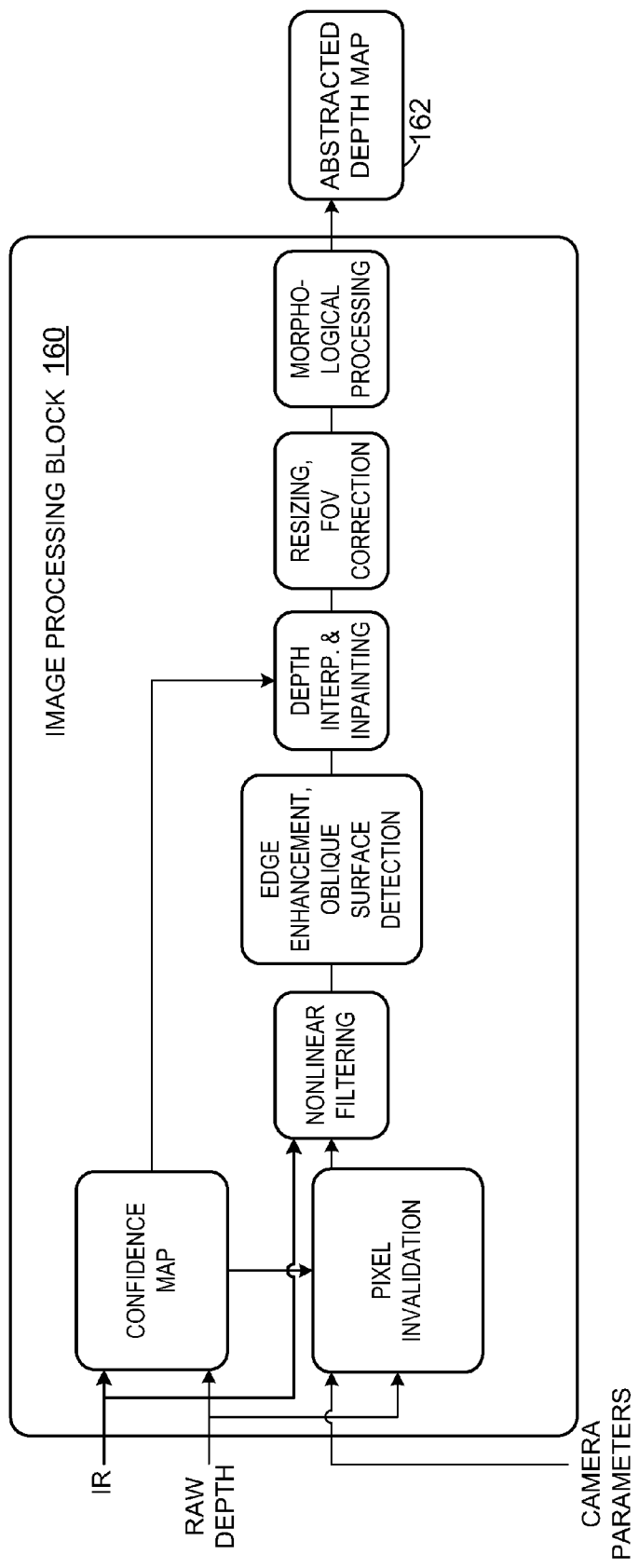
FIG. 10 schematically shows the example image processing block of FIG. 9 in more detail.

FIG. 9 is a high level implementation diagram showing an example image processing block 160 within a depth abstraction layer. FIG. 10 shows the image processing block 160 of FIG. 9 in more detail. As shown in FIGS. 9 and 10, image processing block 160 may receive a raw depth map, information relating to the IR illumination image, and depth camera parameters as inputs. The image processing block may output an abstracted emulation depth image 162 that can be used by a depth image consumer, as described above.

As described below with reference to FIG. 1, a variety of different computing systems may be used without departing from the spirit of this disclosure. The operating environment described with reference to FIG. 1 is provided as an example, but is not meant to be limiting in any way. To the contrary, the illustrated operating environment is intended to demonstrate a general concept, which may be applied to a variety of different operating environments without departing from the scope of this disclosure. Similarly, the schematic depictions of the depth camera interchangeability systems illustrated in FIG. 2 provide a simplified framework for describing depth image virtualization and depth image emulation, but are not intended to limit the application to only those configurations shown in the drawings. To the contrary, the methods and processes described herein may be tied to a variety of different types of computing systems.

Figure 11:
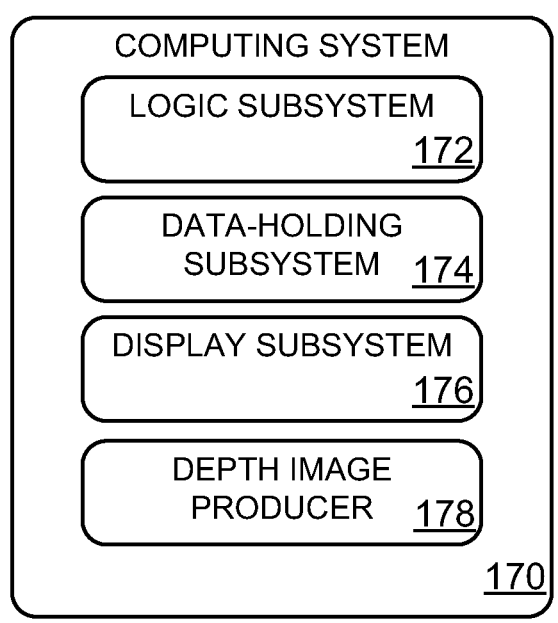
FIG. 11 schematically shows a computing system in accordance with an embodiment of the present disclosure.

FIG. 1 shows a nonlimiting example computing system that may be configured to implement the depth camera interchangeability system with a gaming console 12 and a depth camera 20. As another, more general, example, FIG. 11 schematically shows a computing system 170 that may perform depth image abstraction and/or depth image emulation, as described herein. Computing system 170 may take a variety of different forms, including, but not limited to, gaming consoles, personal computing systems, military tracking and/or targeting systems, and character acquisition systems offering green-screen or motion-capture functionality, among others.

Computing system 170 may include a logic subsystem 172, a data-holding subsystem 174 operatively connected to the logic subsystem, a display subsystem 176, and/or a depth image producer 178. The computing system may optionally include components not shown in FIG. 11, and/or some components shown in FIG. 11 may be peripheral components that are not integrated into the computing system.

Logic subsystem 172 may include one or more physical devices configured to execute one or more instructions. For example, the logic subsystem may be configured to execute one or more instructions that are part of one or more programs, routines, objects, components, data structures, application programming interfaces, or other logical constructs. Such instructions may be implemented to perform a task, implement a data type, transform the state of one or more devices, communicate information to and/or from different computing objects, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 174 may include one or more physical, non-transitory, devices configured to hold data and/or instructions executable by the logic subsystem to implement the herein described methods and processes. When such methods and processes are implemented, the state of data-holding subsystem 174 may be transformed (e.g., to hold different data). Data-holding subsystem 174 may include removable media and/or built-in devices. Data-holding subsystem 174 may include optical memory devices, semiconductor memory devices (e.g., RAM, EEPROM, flash, etc.), and/or magnetic memory devices, among others. Data-holding subsystem 174 may include devices with one or more of the following characteristics: volatile, nonvolatile, dynamic, static, read/write, read-only, random access, sequential access, location addressable, file addressable, and content addressable. In some embodiments, logic subsystem 172 and data-holding subsystem 174 may be integrated into one or more common devices, such as an application specific integrated circuit or a system on a chip.

The terms "module" and "engine" may be used to describe an aspect of computing system 170 that is implemented to perform one or more particular functions. In some cases, such a module or engine may be instantiated via logic subsystem 172 executing instructions held by data-holding subsystem 174. It is to be understood that different modules and/or engines may be instantiated from the same application, code block, object, routine, and/or function. Likewise, the same module and/or engine may be instantiated by different applications, code blocks, objects, routines, and/or functions in some cases. As an example, one or more of the modules described with reference to FIG. 2 may be implemented as an API.

Display subsystem 176 may be used to present a visual representation of data held by data-holding subsystem 174. As the herein described methods and processes change the data held by the data-holding subsystem, and thus transform the state of the data-holding subsystem, the state of display subsystem 176 may likewise be transformed to visually represent changes in the underlying data. Display subsystem 176 may include one or more display devices utilizing virtually any type of technology. Such display devices may be combined with logic subsystem 172 and/or data-holding subsystem 174 in a shared enclosure, or such display devices may be peripheral display devices, as shown in FIG. 1.

Computing system 170 further includes a depth image producer 178 configured to obtain depth images of one or more targets and/or scenes. Depth image producer 178 may be configured to capture video with depth information via any suitable technique (e.g., time-of flight, structured light, stereo image, etc.). As such, depth image producer 178 may include a depth camera, a video camera, stereo cameras, and/or other suitable capture devices. As described with reference to FIGS. 4A-4C above, a depth image producer may include one or more on-camera processors and/or off-camera processors to translate raw depth camera data into depth images. In other words, a depth camera may optionally include one or more onboard processing units configured to perform one or more depth analysis functions. A depth camera may include firmware to facilitate updating such onboard processing logic.

For example, in time-of-flight analysis, the depth image producer 178 may include a time of flight camera configured to emit infrared light to the scene and may then use sensors to detect the backscattered light from the surfaces of the scene. In some cases, pulsed infrared light may be used, wherein the time between an outgoing light pulse and a corresponding incoming light pulse may be measured and used to determine a physical distance from the capture device to a particular location on the scene. In some cases, the phase of the outgoing light wave may be compared to the phase of the incoming light wave to determine a phase shift, and the phase shift may be used to determine a physical distance from the capture device to a particular location in the scene.

In another example, time-of-flight analysis may be used to indirectly determine a physical distance from the capture device to a particular location in the scene by analyzing the intensity of the reflected beam of light over time via a technique such as shuttered light pulse imaging.

In another example, structured light analysis may be utilized by depth image producer 178 to capture depth information. In such an analysis, patterned light (i.e., light displayed as a known pattern such as a grid pattern or a stripe pattern) may be projected onto the scene. On the surfaces of the scene, the pattern may become deformed, and this deformation of the pattern may be studied to determine a physical distance from the capture device to a particular location in the scene.

In another example, the capture device may include two or more physically separated cameras that view a scene from different angles to obtain visual stereo data. In such cases, the visual stereo data may be resolved to generate a depth image. In other embodiments, depth image producer 178 may utilize other technologies to measure and/or calculate depth values.

In some embodiments, two or more different cameras may be incorporated as part of a depth image producer. For example, a depth camera and a video camera (e.g., RGB video camera) may be incorporated into a depth image producer. When a video camera is used, it may be used to provide target tracking data, confirmation data for error correction of scene analysis, image capture, face recognition, high-precision tracking of fingers (or other small features), light sensing, and/or other functions.

Furthermore, while the description above has focused on the use/emulation of a single depth camera, it is to be understood that the above described compatibility technologies may be used to use/emulate two or more depth cameras at the same time. For example, two cameras may be used to view adjacent scenes, and the API may effectively combine information from both cameras to emulate a single camera with a wider field of view. As another example, a single, wide angle camera may be used, and the API may produce two separate depth images as if generated by two cameras with narrow fields of view looking in different directions.

In some embodiments, two or more depth cameras may be used to look at the same scene from different vantage points. In such cases, the API may effectively combine information from both cameras to provide more/better 3D data in a way that is transparent to the depth image consumer.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing depth camera compatibility, the method comprising:
    receiving a native depth image having an unsupported type that is not supported by a depth image consumer;
    processing the native depth image into an emulation depth image of reduced or modified content relative to the native depth image, the emulation depth image usable by the depth image consumer and having a supported type that is supported by the depth image consumer; and
    outputting the emulation depth image having the supported type.

2. The method of claim 1, where receiving the native depth image includes receiving the native depth image from a time of flight depth camera.

3. The method of claim 2, where processing the native depth image includes processing the native depth image from the time of flight depth camera into the emulation depth image, where the emulation depth image emulates a depth image produced by a structured light depth camera.

4. The method of claim 3, where processing the native depth image includes applying an edge preserving filter to the native depth image.

5. The method of claim 3, where processing the native depth image further includes building a confidence map by passing a median filter on an illumination image.

6. The method of claim 5, where building the confidence map includes applying the median filter and a soft threshold function to the illumination image.

7. The method of claim 5, where processing the native depth image further includes building an oblique surface map from the native depth image.

8. The method of claim 7, where processing the native depth image further includes unifying the confidence map and the oblique surface map into an invalidation testing map.

9. The method of claim 8, further comprising invalidating pixels of the invalidation testing map that are outside a predetermined range.

10. The method of claim 3, where processing the native depth image further includes enhancing edges between adjacent pixel regions with different depth values in the native depth image.

11. The method of claim 3, where processing the native depth image further includes quantizing depth values.

12. The method of claim 3, where processing the native depth image further includes assigning deeper depth values to pixels belonging to objects below a threshold size.

13. The method of claim 3, where processing the native depth image further includes assigning shadow pixel values to pixels that are virtually occluded from a virtual vantage point of a virtual sensor virtually spaced away from the time of flight depth camera.

14. The method of claim 1, further comprising receiving from the depth image consumer supported virtual depth camera parameters for the depth image consumer.

15. The method of claim 14, where receiving supported virtual depth camera parameters includes receiving an indication of a model depth camera that is compatible with the depth image consumer.

16. The method of claim 15, where processing the native depth image into the emulation depth image includes modifying the native depth image to emulate a depth image produced by the model depth camera.

17. A machine-readable storage device holding instructions executable by a logic device to:
    receive a native depth image having an unsupported type that is not supported by a depth image consumer;
    process the native depth image into an emulation depth image of reduced or modified content relative to the native depth image, the emulation depth image usable by the depth image consumer and having a supported type that is supported by the depth image consumer; and
    output the emulation depth image having the supported type.

18. The machine-readable storage device of claim 17, further holding instructions executable by the logic device to:
    receive from the depth image consumer an indication of a model depth camera that is compatible with the depth image consumer.

19. The machine-readable storage device of claim 18, further holding instructions executable by the logic device to:
    modify the native depth image to emulate a depth image produced by the model depth camera.

20. A depth camera interchangeability system for converting a native depth image from a time of flight depth camera to an emulation depth image emulating a depth image produced by a structured light depth camera, comprising:
    a capture module to receive the native depth image from the time of flight camera;
    a noise suppression module configured to preserve depth edges between adjacent pixel regions with different depth values in the native depth image;
    an edge enhancement module configured to enhance depth edges between adjacent pixel regions with different depth values in the native depth image;
    an invalidation module configured to invalidate pixels having a combined illumination and obliqueness outside a predetermined range;
    a depth quantization module configured to quantize depth values;
    a small object correction model configured to assign deeper depth values to pixels belonging to objects below a threshold size; and
    a shadow simulation module configured to assign shadow pixel values to pixels that are virtually occluded from a virtual vantage point of a virtual sensor virtually spaced away from the time of flight depth camera.

* * * * *